United States Patent
Bruemmer et al.

(10) Patent No.: US 9,606,217 B2
(45) Date of Patent: Mar. 28, 2017

(54) COLLABORATIVE SPATIAL POSITIONING

(71) Applicant: 5D Robotics, Inc., Carlsbad, CA (US)

(72) Inventors: David J. Bruemmer, Carlsbad, CA (US); Benjamin C. Hardin, Vista, CA (US); Curtis W. Nielsen, Carlsbad, CA (US)

(73) Assignee: 5D Robotics, Inc., Carlsbad, CA (US)

( * ) Notice: Subject to any disclaimer, the term of this patent is extended or adjusted under 35 U.S.C. 154(b) by 847 days.

(21) Appl. No.: 13/873,606

(22) Filed: Apr. 30, 2013

(65) Prior Publication Data

US 2014/0049429 A1 Feb. 20, 2014

Related U.S. Application Data

(60) Provisional application No. 61/641,201, filed on May 1, 2012, provisional application No. 61/652,347, filed on May 29, 2012, provisional application No. 61/773,063, filed on Mar. 5, 2013.

(51) Int. Cl.
| | |
|---|---|
| *G01S 5/12* | (2006.01) |
| *G01S 5/02* | (2010.01) |
| *G01S 5/00* | (2006.01) |
| *G01C 21/20* | (2006.01) |

(52) U.S. Cl.
CPC ............ *G01S 5/0289* (2013.01); *G01C 21/20* (2013.01); *G01S 5/009* (2013.01); *G01S 5/0009* (2013.01); *G01S 5/0257* (2013.01); *G01S 5/0263* (2013.01)

(58) Field of Classification Search
None
See application file for complete search history.

(56) References Cited

U.S. PATENT DOCUMENTS

| | | | | |
|---|---|---|---|---|
| 6,542,819 B1* | 4/2003 | Kovacs | ................. | G01C 21/28 701/408 |
| 6,801,855 B1* | 10/2004 | Walters | ................. | G01S 19/49 340/995.1 |
| 7,047,022 B2* | 5/2006 | Aoyama | ............... | G01S 5/0072 455/404.2 |
| 7,084,809 B2* | 8/2006 | Hockley, Jr. | .......... | G01S 5/0072 342/357.48 |
| 2003/0191568 A1* | 10/2003 | Breed | ................... | B60W 40/06 701/36 |
| 2005/0060069 A1 | 3/2005 | Breed et al. | | |
| 2007/0159388 A1* | 7/2007 | Allison | ................. | G01S 5/0072 342/357.29 |
| 2007/0225016 A1* | 9/2007 | Jendbro | ................. | G01S 19/05 455/456.1 |
| 2008/0009970 A1 | 1/2008 | Bruemmer et al. | | |
| 2009/0115657 A1* | 5/2009 | Cheng | .................... | G01S 19/05 342/357.42 |
| 2010/0198512 A1 | 8/2010 | Zhang et al. | | |
| 2011/0046781 A1 | 2/2011 | Summer | | |

* cited by examiner

*Primary Examiner* — Gregory C Issing
(74) *Attorney, Agent, or Firm* — Martensen IP

(57) ABSTRACT

Disparate positional data derived from one or more positional determinative resources are fused with peer-to-peer relational data to provide an object with a collaborative positional awareness. An object collects positional determinative information from one or more positional resources so to independently determine its spatial location. That determination is thereafter augmented by peer-to-peer relational information that can be used to enhance positional determination and modify behavioral outcomes.

42 Claims, 5 Drawing Sheets

COLLABORATIVE SPATIAL POSITIONING

RELATED APPLICATION

The present application relates to and claims the benefit of priority to U.S. Provisional Patent Application No. 61/641,201 filed 1 May 2012, U.S. Provisional Patent Application No. 61/652,347 filed 29 May 2012, and U.S. Provisional Patent Application No. 61/773,063 filed 5 Mar. 2013, all of which are hereby incorporated by reference in their entirety for all purposes as if fully set forth herein.

BACKGROUND OF THE INVENTION

Field of the Invention

Embodiments of the present invention relate, in general, to determining the relative position of an object and, more particularly, to collaborative spatial positioning using a plurality of independent sources of positional data.

Relevant Background

Sensor fusion is the combining of sensory data or data derived from sensory data from disparate sources such that the resulting information is, in some sense, better than would be possible when these sources were used individually. By comparison, data fusion is the process of integration of multiple data and knowledge representing the same object into a consistent, accurate, and useful representation. In each case the overall goal is to provide more accurate, more complete, or more dependable/reliable result.

The data sources for a fusion process are not specified to originate from identical sensors. Indeed, one could argue that disparate data sources related to the same goal may provide a more accurate and more reliable product. While the fusion of multiple sensory data so as to provide "better" data is admirable, better data by itself is often inadequate. This is particularly true with respect to the behavioral use of spatial or positional data.

Understanding one's precise location has been a long quest throughout history. By possessing positional knowledge combined with an accurate map, one would think that many of the challenges from getting from point A to B would be resolved. Yet despite the ubiquitous nature of GPS systems, people continue to get lost, traffic jams continue to occur and collisions remain a threat. Indeed, one might argue that such systems have made the problems worse. Lacking in the prior art is a fusion of disparate positional determinative resources that provides a user with not only geospatial/spatial data but also relational information that can form the basis for a behavioral modification. Particularly lacking is a means to gain the ideal benefits of both absolute and relative positioning at the same time by appropriately combining multiple positioning techniques.

GPS is an example of absolute positioning and provides the benefit of supporting path planing, facilitating communication about positioning over large distances, and providing a persistent understanding of where things are in the world. Relative positioning has the benefit of being robust, more precise and does not require connection to an external source (i.e., satellite). Prior teachings have not provided a means to gain the benefits of both approaches simultaneously. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

One or more embodiments of the present invention present a multifaceted positional approach that embed identification data and entity attributes into an entity and provides relative distance and heading using mobile receivers/antennas. Moreover, this capability is linked to global positioning resources via geo-referenced receivers/antennas to provide accurate and real time positional awareness outside the capability of current systems.

A major advantage of the invention is that it provides accurate, continuous position information based on a plurality of resources. It does this by using multiple independent components that each provides unique spatial qualities. Each component also has a limited utility so by uniquely combining of disparate components, a reliable position is determined and maintained. Recall that GPS is unavailable in many situations (indoors, under tree canopy, underground, caves, bunkers and tunnels). This does not mean that GPS is a poor tool, but it does mean that it cannot, in and of itself, provide reliable positioning throughout the spectrum of terrain that need be navigated by mobile vehicles and other objects.

Consequently, embodiments of the present invention includes a novel method for filtering and fusing positional data from a plurality of components. This method, described below, also allows the overall system to reason probabilistically about the true position of the vehicle (or object) based on the input from each component.

According to one embodiment of the present invention, an active ranging resource, such as Ultra Wide Band (UWB) Radio Frequency Identification (RFID) tags, in a relative position scheme, provide local, nearest neighbor positional understanding when a fixed receiver infrastructure is not available, and can exploit infrastructure positional data when it is available to provide position awareness. The approach of the present invention uniquely balances distinct components of positional information.

One method embodiment for collaborative spatial position determination between objects includes receiving positional information of a first object derived from one or more disparate position determination techniques and thereafter, determining for the first object positional information variances for each of the one or more disparate position determination techniques. The process continues by combining positional information gained from the one or more disparate position determination techniques to determine a first object spatial position while communicatively coupling the first object to a second object. Once communicatively coupled, each object exchanges positional information wherein the second object refines a second object spatial location based, in part, on the first object spatial position.

In another embodiment of the present invention, a system for collaborative determination of spatial position includes a first object, a second object, one or more disparate position determination resources operable to determine for the first object a first object spatial position, and a communication link between the first object and the second object wherein the second object is operable to refine for the second object a second object spatial position based, at least in part, on first object spatial position received from the first object.

In another embodiment, a system for collaborative determination of spatial position can include a first transceiver operable to receive positional information of a first object derived from one or more disparate position determination techniques, a memory operable to store positional information received from the one or more disparate position determination techniques, a second transceiver operable to communicatively link the first object to a second object, a processor communicatively coupled to the memory and capable of executing instructions embodied as software, and a plurality of software portions.

The software portions can be configured to determine a variance in the positional information received from each of the one or more disparate position determination techniques, to combine positional information received from the one or more disparate position determination techniques to determine a first object spatial position, and to exchange between the first object and the second object positional information so as to enable the second object to refine a second object spatial location based, in part, on the first object's spatial position.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
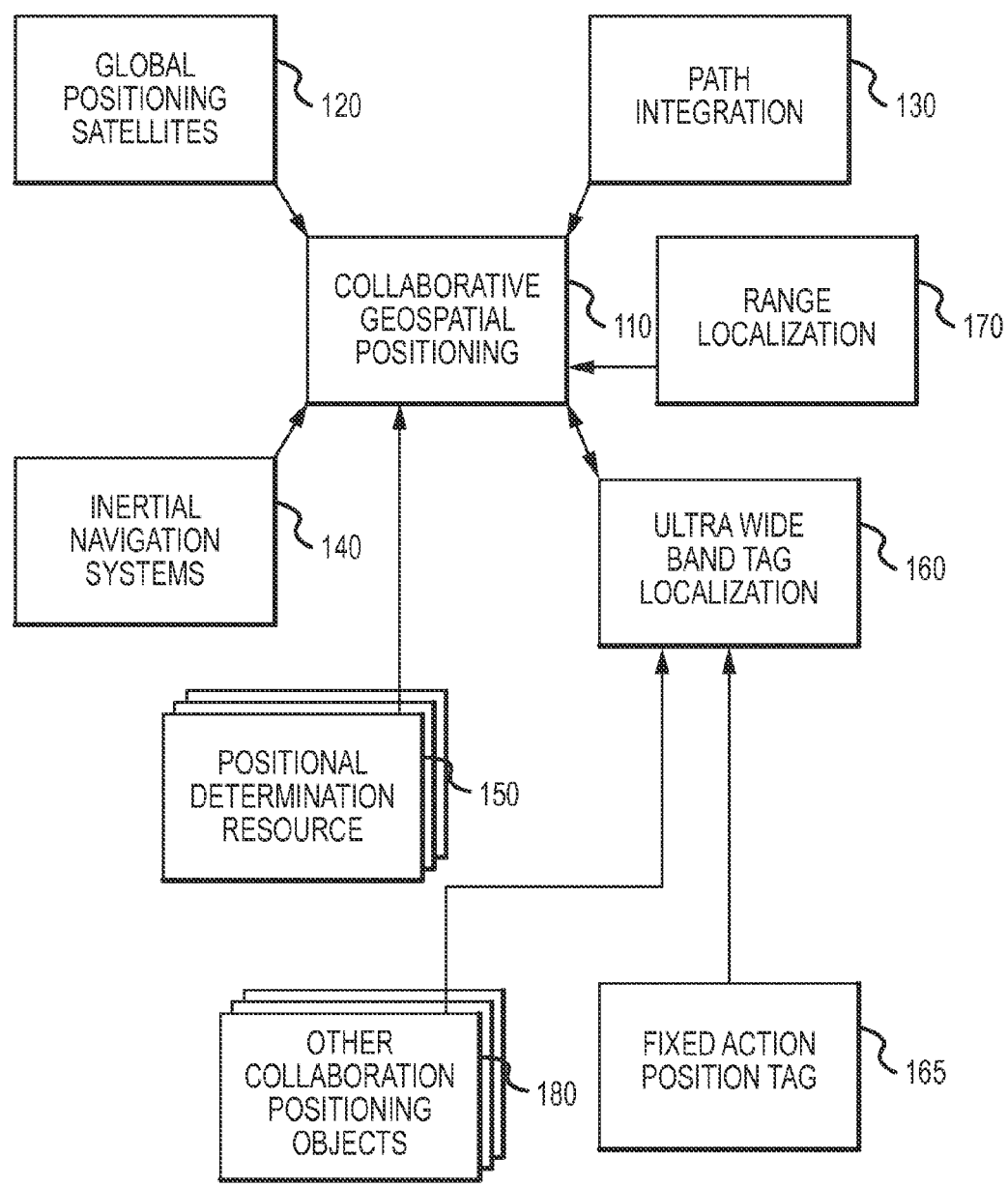
FIG. 1 presents a high level block diagram of a system for collaborative spatial positioning according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Disparate positional data derived from one or more positional determinative resources are fused with peer-to-peer relational information to provide an object with a collaborative positional awareness. According to one embodiment of the present invention, an object collects positional determinative information from one or more positional resources so to independently determine its spatial location. This determination is not hierarchal but rather balanced based on a plurality of factors that, from time to time, may change. Once a spatial position is determined, it can thereafter be augmented by peer-to-peer relational information that can be used to enhance positional determination and modify behavioral outcomes. These and other applications of a system and associated methodology for collaborative spatial positioning are possible and contemplated by one or more embodiments of the present invention.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description, with reference to the accompanying drawings, is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

By the term "substantially," it is meant that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an," and "the" are intended to include the plural forms as well, unless the context clearly indicates otherwise. Thus, for example, reference to "a component surface" includes reference to one or more of such surfaces.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting," "mounted," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

According to one embodiment of the present invention, a collaborative positional determination approach provides accurate, reliable positioning, including a well-structured balance of positional data obtained from, for instance, Global Positioning System (GPS), laser-based localization, enhanced dead reckoning and an active tag (ranging) tracking technology that provides local area relative heading and distance. In one implementation of the present invention described above, GPS provides long range positioning and links the relative positioning to the global frame of reference, while laser localization permits a coherent local terrain understanding using a laser mapping strategy. Enhanced dead reckoning handles slippages and improves hazard detection by tracking minute movements of the robot over short intervals and tag tracking capability ensures a bound can be set on error (less than +/−6 inches) and allows a reactive, non-line-of-sight position capability. While the above example describes four means by which to gain positional data, one of reasonable skill in the relevant art will recognize that other positional determinative resources are equally applicable to the present invention and are indeed contemplated in their application and implementation. For example LIDaR (LIght Detection and Ranging or Laser Imaging Detection and Ranging) can be employed, as can vision detection systems and the like.

A key advantage to the approach of the present invention is that it offers redundancy in the sense that each capability complements the others. One of the most immediate applications of the technology is to extend and enhance GPS (or similar technology) in areas where GPS is unavailable or inaccurate.

The conventional wisdom is that GPS can be used as the positioning solution, but sufficient error exists such that GPS cannot be used as the primary means to coordinate a variety of critical capabilities such as close quarters movement, multi-vehicle coordination or the need for precise marking and manipulation. Even with differential GPS solutions, the system is not generally robust and reliable under tree cover, in bunkers, caves, buildings and many other situations. To better understand the limitations of GPS consider the following.

GPS is a locational and navigational system that allows users to pinpoint a place on the Earth with reasonable accuracy. The current GPS system makes use of signals transmitted by some of the 24 dedicated satellites circling the globe in precisely defined orbits. Using the satellites as reference points, GPS receivers calculate their positions based on the difference in arrival time of signals from the different satellites. Although GPS was initially developed for the U.S. military to guide missiles to targets, it is now routinely used for air traffic control systems, ships, trucks and cars, mechanized farming, search and rescue, tracking environmental changes, and more.

As mentioned above, GPS is a space-based satellite navigation system that provides location and time information in all weather, anywhere on or near the Earth, where there is an unobstructed line of sight to four or more GPS satellites. (In some cases a location determination can be made with three satellites.) The GPS program provides critical capabilities to military, civil and commercial users around the world and is the backbone for modernizing the global air traffic system, but it is not without its limitations.

To determine a location on the earth, a GPS receiver calculates its position by precisely timing the signals sent by GPS satellites high above the Earth. Each satellite continually transmits messages that include the time the message was transmitted and the satellite position at time of message transmission.

The receiver uses the messages it receives to determine the transit time of each message and computes the distance or range to each satellite. These distances, along with the satellites' locations, are used to compute the position of the receiver. A satellite's position and range define a sphere, centered on the satellite, with radius equal to the range. The position of the receiver is somewhere on the surface of this sphere. Thus, with four satellites, the indicated position of the GPS receiver is at or near the intersection of the surfaces of four spheres. In the ideal case of no errors, the GPS receiver would be at a precise intersection of the four surfaces.

One of the most significant error sources is the GPS receiver's clock. Because of the very large value of the speed of light, c, the estimated distances from the GPS receiver to the satellites, the range, are very sensitive to errors in the GPS receiver clock; for example an error of one microsecond (0.000001 second) corresponds to an error of 300 meters (980 ft). This suggests that an extremely accurate and expensive clock is required for the GPS receiver to work; however, manufacturers prefer to build inexpensive GPS receivers for mass markets. This dilemma is resolved by taking advantage of the fact that there are four ranges.

It is likely that the surfaces of the three spheres intersect, because the circle of intersection of the first two spheres is normally quite large, and thus, the third sphere surface is likely to intersect this large circle. If the clock is wrong, it is very unlikely that the surface of the sphere corresponding to the fourth satellite will initially intersect either of the two points of intersection of the first three, because any clock error could cause it to miss intersecting a point. On the other hand, if a solution has been found such that all four spherical surfaces at least approximately intersect with a small deviation from a perfect intersection then it is quite likely that an accurate estimation of receiver position will have been found and that the clock is quite accurate.

The current GPS system is comprised of three segments; the space segment, the control segment and the user segment. The space segment (SS) is as one might imagine, composed of the orbiting GPS satellites. The orbits are centered on the Earth, not rotating with the Earth, but instead fixed with respect to the distant stars. The orbits are arranged so that at least six satellites are always within line of sight from almost everywhere on Earth's surface. The result of this objective is that the four satellites are not evenly spaced (90 degrees) apart within each orbit. In general terms, the angular difference between satellites in each orbit is 30, 105, 120, and 105 degrees apart, which, of course, sum to 360 degrees.

The control segment is composed of a master control station (MCS), an alternate master control station, four dedicated ground antennas, and six dedicated monitor stations. The flight paths of the satellites are tracked by dedicated monitoring stations. Then the agency responsible for the satellites contacts each GPS satellite regularly with navigational updates using dedicated or shared ground antennas. These updates synchronize the atomic clocks on board the satellites to within a few nanoseconds of each other, and adjust the ephemeris of each satellite's internal orbital model.

The user segment is composed of hundreds of thousands of U.S. and allied military users of the secure GPS Precise Positioning Service, and tens of millions of civil, commercial and scientific users of the Standard Positioning Service. In general, GPS receivers are composed of an antenna, tuned to the frequencies transmitted by the satellites, receiver-processors, and a highly stable clock (often a crystal oscillator). They may also include a display for providing location and speed information to the user. Each segment introduces error into the equation and while GPS provides reliable information regarding the general location of an object, it fails to provide precision information. Moreover, it is fundamentally limited in that it requires an unobstructed line of sight to each of at least 4 satellites.

To address some of the limitations of GPS, it has been determined that localization based on range information (i.e. video, radar, sonar or laser data) can provide positional improvements, especially in urban situations or outdoor areas with visible features. According to one embodiment of the present invention, GPS technology is seamlessly integrated with simultaneous localization and mapping to provide enhanced navigation, search and detection. Clear, persistent features that can be seen by the laser or other range finding apparatus can provide very robust data regarding the surrounding environment. In situations in which there are known locations of persistent objects, a laser (or other range finder) can be integrated with GPS data to narrow the variances in positional awareness. For example, if a GPS signal provides a location within a number of meters and, based on that location the device should be able to identify two or more puissant objects of a known location, the range information can be used to improve the accuracy of the GPS position. However, this technology has definite limitations, especially if there are no persistent obstacles for the system to localize off of and again, laser or range technology in general requires an unobstructed line of sight to the persistent objects, as well as that the identified objects must be of a known location.

Another type of positional sensor that is contemplated by the present invention is an inertial sensor. Together with radio beacons and GPS, inertial sensors form the basis for most navigation systems in aircraft. Inertial systems operate based on perceptions of motion; that is the measurements of acceleration and displacement from a known position. If an object knows its starting location, using data that provides both linear and angular acceleration and the laws of motion, the displacement of an object from that known location can be determined. Gyroscopes, both mechanical and optical, can be used to measure linear and angular motion through applications of the law of conservation of momentum. Unlike GPS or range localization, inertial navigational systems are self-contained. That is, they do not depend on any other source of information to determine an objects position. For example, if a device equipped with an inertial navigation system was instructed to proceed from its current location to another location measured from its point of origin, the device would know when it arrived at that location, as well as its position at any time during the motion, relative to its origin. It would not matter if it was in an open filed or in the basement of a building or in a cave. However, inertial navigation systems are only as good as the initial data that was input into the system (its initial location) and any precession in the equipment over time. All inertial navigation systems suffer from integration drift: small errors in the measurement of acceleration and angular velocity are integrated into progressively larger errors in velocity, which are compounded into still greater errors in position. Since the new position is calculated from the previous calculated position and the measured acceleration and angular velocity, these errors accumulate roughly proportionally to the time since the initial position was input. Therefore, the position must be periodically corrected by input from some other type of navigation system. The accuracy of an objects location varies based on the accuracy of the initial data and a point at which the objects actual position was updated.

A related means by which to determine position, and one contemplated by the present invention, is dead reckoning or path integration. In navigation, path integration is the process of calculating one's current position by using a previously determined position, or fix, and advancing that position based upon known or estimated speeds over elapsed time and course. Animals and humans instinctively practice path integration. For example, when you get up from a desk and go down the hall to the coffee room, you record distance of travel, turns and stops. If you would attempt to make the same trip with your eyes closed, accuracy would surely suffer, but most individuals would be able to recreate their path and/or understand their position.

Path integration is subject to cumulative errors. While the use of GPS and other positional resources have made simple dead reckoning seemingly obsolete for most purposes, dead reckoning can provide very accurate directional information and positional information. Dead reckoning may give the best available information on position, but is subject to significant errors due to many factors as both speed and direction must be accurately known at all instants for position to be determined accurately. For example, if displacement is measured by the number of rotations of a wheel, any discrepancy between the actual and assumed diameter, due perhaps to the degree of inflation and wear, will be a source of error. As each estimate of position is relative to the previous one, errors are cumulative.

Dead reckoning can be implemented to overcome the limitations of GPS technology. Satellite microwave signals are unavailable in parking garages and tunnels, and often severely degraded in urban canyons and near trees due to blocked lines of sight to the satellites or multipath propagation. In a dead-reckoning navigation system, the system is equipped with sensors that know the wheel diameter and record wheel rotations and steering direction. The navigation system then uses a Kalman filter, that is an algorithm that uses a series of measurements observed over time, containing noise (random variations) and other inaccuracies, and produces estimates of unknown variables that tend to be more precise than those based on a single measurement alone, to integrate the available sensor data with the occasionally unavailable position information into a combined position fix. Using this method a navigation system in a car, for example, can tolerate going into a tunnel or traveling between large buildings that would otherwise obscure the GPS signal.

Another component of the collaborative positioning approach of the present invention involves using active ranging technology such as an ultra wide-band (UWB) radio frequency (RF) identification (ID) tag (collectively RFID). An RFID system consists of tags, a reader with an antenna, and software such as a driver and middleware. The main function of the RFID system is to retrieve information (ID) from a tag (also known as a transponder). Tags are usually affixed to objects such as goods or animals so that it becomes possible to locate where the goods and animals are without line-of-sight. A tag can include additional information other than the ID. As will be appreciated by one of reasonable skill in the relevant art, other active ranging technology is equally applicable to the present invention and is contemplated in its use. The use of the term "tags" or "RFID tags," or the like, is merely exemplary and should not be viewed as limiting the scope of the present invention.

An RFID reader, together with an antenna, reads (or interrogates) the tags. An antenna is sometimes treated as a separate part of an RFID system. It is, however, more appropriate to consider it as an integral feature in both readers and tags since it is essential for communication between them. There are two methods to communicate between readers and tags; inductive coupling and electromagnetic waves. In the former case, the antenna coil of the reader induces a magnetic field in the antenna coil of the tag. The tag then uses the induced field energy to communicate data back to the reader. Due to this reason, inductive coupling only applies in a few tens of centimeter communication. In the latter case, the reader radiates the energy in the form of electromagnetic waves that possess much longer range opportunities. Some portion of the energy is absorbed by the tag to turn on the tag's circuit. After the tag wakes up, some of the energy is reflected back to the reader. The reflected energy can be modulated to transfer the data contained in the tag.

In one implementation of the present invention, ranging information from devices such as a RFID or UWB tag cannot only be associated with a piece of stationary infrastructure with a known, precise, position, but also provide active relative positioning between objects. Moreover, the tag can be connected to a centralized tracking system to convey interaction data. As a mobile object interacts with the tag of a known position, the variances in the objects positional data can be refined. Likewise, a tag can convey between objects relative position and relative motion. Such tags possess low-detectability and are not limited to line of sight nor are they vulnerable to jamming. And, depending on how mounted and the terrain in which they are implemented, a tag and tracking system can permit user/tag interaction anywhere from 200 ft to 2 mile radius of accurate positioning. Currently tags offer relative position accuracy of approximately +/−12 cm for each interactive object outfitted with a tag. As will be appreciated by one of reasonable skill in the relevant art, the use of the term object is not intended to be limiting in any way. While the present invention is described by way of examples in which objects may be represented by vehicles or cellular telephones, an object is to be interpreted as an arbitrary entity that can implement the inventive concepts presented herein. For example, an object can be a robot, vehicle, aircraft, ship, bicycle, or other device or entity that moves in relation to another. The collaboration and communication described herein can involve multiple modalities of communication across a plurality of mediums.

As previously discussed, conventional sensor fusion approaches involve continuous receipt and transmission of detailed raw data that requires high bandwidth communications systems. High bandwidth communications systems are very expensive and this approach often imposes a high workload on users or analysts to extract locally relevant insights across even a few modalities to geographically separated users. Moreover, existing strategies do not answer the questions "Where do I go (or not go) from here?" or "What is moving towards me?" in a timely manner.

FIG. 1 presents a high-level block diagram of a system 100 for collaborative spatial positioning according to one embodiment of the present invention. According to one embodiment of the present invention, an object 110 can employ collaborative spatial positioning by receiving positional information from one or more positional determination resources 150. These resources can, in one embodiment of the present invention, include global positioning satellites 120, path integration 130, inertial navigation systems 140, ultra wide band tag localization 160, and range localization 170.

As is described herein, the present invention combines various forms of positional data to arrive at a spatial representation of an object in its environment. In one instance, that representation may be globally based on geospatial data, however, in other instances, the representation may be based on a different set of reference indicators or an object may generate its own frame of reference. Indeed, the present invention contemplates scenarios in which one or more objects, or groups of objects, can operate or generate differing frames of reference (spatial awareness) that are seamlessly integrated.

In one implementation of the present invention, the object 110 receives position information or data from various positional determination resources 150 that aids in the object's determination of its spatial location. As one of reasonable skill in the relative art will appreciate, and as discussed above, each positional determination resource 150 possesses advantages and disadvantages. GPS 120, for example, requires an unobstructed line of sight to (optimally) 4 orbiting satellites that each transmit separate and time identification signals. Based on the reception delay of the received signals, the receiver can compute a probabilistic location. Should the object 110 enter a building or region in which the line of sight between these satellites is obstructed or obfuscated, the positional determination becomes unreliable. Moreover, despite GPS' worldwide acceptance for general locational determination, it does not provide adequate accuracy for precision movements.

Similarly the object 110 may receive positional information from an inertial navigation system 140. Unlike GPS 120, an inertial navigation system measures accelerations and time to determine relative displacement of the object 110 from an initial starting position. Thus, moving into a building, cave or under a canopy of trees does not affect the operation of such a system. However, the system is limited by not only the accuracy of its starting point but also its ability to maintain a stable platform. If the location of its initiation point is in error, then its determination of position based on displaced motion is also in error. Such platforms are also known to precess, meaning that over time the system is less and less accurate. This precession is magnified if the accuracy of the starting point is questionable. If the system, during operation, is updated to provide parameters for its variance, it can assume that the update is accurate and thus the difference from where it is, based on the update, and where it thinks it should be, is based on drift in the system. The system can then continue to adjust for such drift. However, if the initial location was inaccurate, an update can introduce error rather than eliminate error, making the system more inaccurate than if it was simply left alone. As one of reasonable skill in the art will appreciate, as with GPS, inertial navigation systems also have their limitations.

The present invention integrates positional information from a plurality of sources so as to determine the object's 110 spatial location. GPS 120, inertial navigation systems 140, path integration 130, range localization 170 and other positional determinative resources 150 are synthesized by the collaborative spatial positioning process to arrive at an optimal, reliable and accurate position. This synthesis includes weighing each source based on its perceived accuracy and historical variance. By doing so, the determination and accuracy of an object's position can be maintained despite varying degrees of accuracy and reliability of any one positional determination resource. According to another embodiment of the present invention, the process by which positional determinative resources 150 are combined can also be based on agreement or disagreement between resources as to the location of the object. For instance, if three of four positional resources agree as to the location of the object, the fourth determination can be dismissed as likely being in error. However, the determination of which resource to rely upon becomes more difficult when there are multiple conflicts or multiple agreements as to a differing location of the object. According to one embodiment of the present invention, the positional determinative resources are prioritized based on a plurality of factors. Using this sort of priority schedule, a determination can be made as to which resource (or combination of resources) to rely upon should there exist a conflict between the individual positional determinations. For example, a GPS determination of an object's position (albeit inaccurate) may generally agree with a vision detection system's determination. But both of these disagree with that produced by a laser system that, while very accurate, possesses ambiguity as to which target it is measuring. Thus, one or more embodiments of the present invention assign and assess a value on each positional determination resource and then balance these determinations to arrive at the highest probable location. By combining positional determination resources in such a manner, those sensors that provide unambiguous reports such as UWB tags, RFID tags, GPS and the like, can be used to provide a 'rough' location of a target and then resources that possess more precision (albeit sometimes ambiguous) can be used to refine the locational information.

For example, one object may be able to determine the location of another nearby object or target using UWB tags or GPS to within 2 meters. Using that information, a laser range finder can be trained to that general location to reduce the accuracy of the locational information to millimeters. However, if the laser was used independently, it may just as well identify another target 3 meters to the left, as the laser's field of view is very narrow. Rules can be developed and established regarding the collaboration of positional determinative resources.

The positional determination techniques of the present invention balances comparative variances of differing sensor platforms, as well as strengths and weaknesses of subsets of these sensor platforms, to arrive at a real-time optimal determination of an object's position. It thus can ignore a resource that appears to be erroneous in favor of other "agreeing" reports. These balancing algorithms are continually updated based on the variance of each resource. Moreover, the present invention fuses positional data from different sensory resources that report the same conclusion (data) but with different levels of accuracy. In one embodiment of the present invention, rather than select one resource over another, if both appear to be identifying the same location, albeit with differing accuracy, the present invention weighs their contribution to provide an optimal result.

The present invention goes beyond fusion of sensory data by also capturing and using the positional awareness of other objects in the system 100. This peer-to-peer communication enables otherwise isolated objects to ascertain and/or refine a positional determination based not only on internal sensory data but the positional determination and data of one or more other objects or nodes. Other positional or state data can also be communicated between objects. For instance, destinations can be passed throughout a network and stored on each object as if each object itself maintained an entire repository of possible destinations and a route by which to go there. Destinations can be passed throughout the network as well as resources associated with each location.

According to one embodiment of the present invention, and as shown in FIG. 1, a communication link is established between other collaborative spatial positioning objects 110, 180. In one implementation of the present invention, a UWB tag 160 provides a means by which to exchange data and positional awareness between two or more objects within the system 100. The collaborative nature of the exchange of data between objects lets each object not only determine its relative position independently, but gain additional resources and accuracy by linking to that of another object. Moreover, each object can provide the other with not only its position in a spatial sense, but its relative local position. For example, two linked objects may know within a certainty their spatial location within 1 meter, but at the same time be able to provide a relative position with accuracy to a few centimeters. In addition, linking to additional objects can enable a single object to determine its relative positions and, in some instances, its geospatial position. In other instances of the present invention, such a communication link between other objects can be used to provide additional data to enhance internal positional determination capabilities. Moreover, the data that is conveyed can be at various levels of specificity. For example, in one embodiment of the present invention, each object can independently determine its spatial position. That object can then convey its determination of its spatial position to other objects within the same frame of reference. Alternatively and according to another embodiment of the present invention, objects can convey specific positional data about its spatial position which can then be discretionarily used by other objects. For example, an object can convey that, within a certain reference frame, its location is X with a certain degree of variance. Alternatively, or in addition, it can also convey GPS information, inertial information, range triangulation information, etc., so that the receiving entity can then use or discard such specific information based on accuracy or data it requires to enhances its own spatial awareness. This combination of accurate relative position data combined with a collaborative spatial position determination enables embodiments of the present invention to accurately integrate combined motion and activities, including predictive behavior and interactions.

While the invention has been, and will be, particularly shown and described with reference to embodiments, it will be understood by those skilled in the art that various other changes in the form and details may be made without departing from the spirit and scope of the invention.

Figure 2:
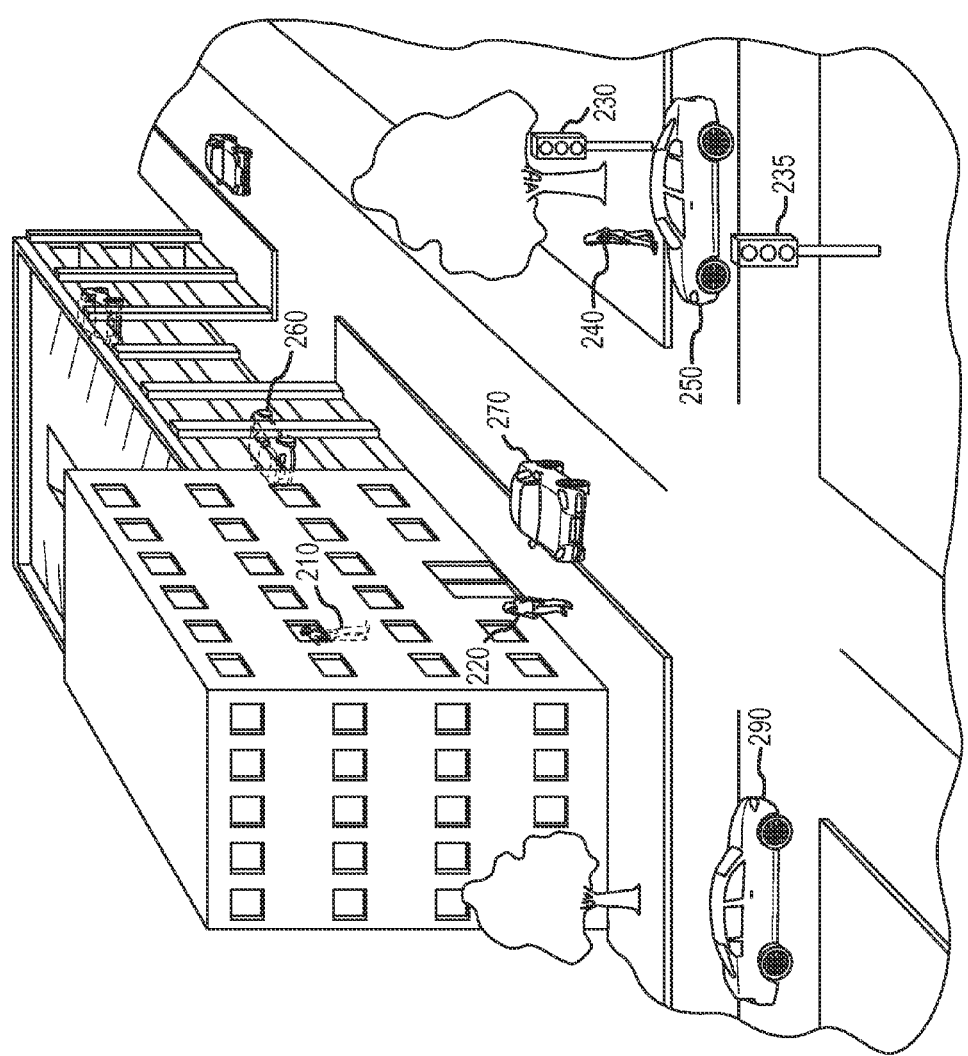
FIG. 2 shows a makeshift urban environment in which collaborative spatial positioning according to one embodiment of the present invention may be implemented.

To better understand the complexities of the collaborative spatial positioning system of the present invention, consider the following simplified example. FIG. 2 shows a makeshift urban environment in which collaborative spatial positioning according to one embodiment of the present invention may be implemented.

Assume a plurality of objects 210, 220, 240, 250, 260, 270 exists wherein each internally possess the ability to utilize one or more positional resources to determine their spatial location. For example, each object may possess a GPS receiver, inertial systems, laser localization, dead reckoning technology, and the like, and as well as being equipped with a UWB tag for interactive communication. Each, however, has differing abilities to utilize each of their resources. For example, two of the objects 210, 220 may be in a location, a building for example, where a GPS signal is not available or where there is limited range localization opportunities, but each possess accurate data with respect to the local environment. In essence, they cannot independently determine their geospatial position. That is, they may have a map of the environment, but they don't know where they are on the map. A third and fourth object 240, 250 possess a GPS location but, given the signal strength and interference, its accuracy is questionable. However, both of these objects 240, 250 are within range of known positional markers 230, 235. The markers possess a known geospatial location and using relative locational technology, the objects close to that tag, despite having poor GPS reception, can accurately determine their location.

As one of reasonable skill in the relative art will appreciate, to determine a spatial position based on range information requires three independent sources. An object receiving a signal from a transmitter can determine it is of a certain range from that transmitter. Knowing the transmitter's location, the receiver can conclude its position is on the surface of a sphere whose radius is the range of transmission and whose origin is the location of the transmitter. Receiving information from two such sources provides the intersection of two spheres which forms a circle. Thus, the receiver in this example resides somewhere in the intersecting circle. Ideally, three intersecting spheres identifies the point at which the receiver resides. However, it is possible to use an objects independent determination of its spatial location to reduce the locus of points of where it is located. An object receiving range information from two known positions 230, 235 knows it exists on a circle defined by the intersection of two spheres. But it itself possesses information regarding its spatial location that can be integrated with the received information to refine its spatial location.

Continuing with the example shown in FIG. 2, assume further that two nearby objects 240, 250 are in communication with each other and both are in communication with fixed markers (streetlights) 230, 235. But as previously indicated the independent geospatial resources (GPS) of the two objects 240, 250 is unreliable. However, each can act as a third source of positional data to assist in the other to arrive at a more refined and precise geospatial location. As mentioned, the data received from the fixed location markers 230, 235 provides an intersection location of a circle. From the first object's 230 perspective, range information from the other object 250 can result in a definitive geospatial location. That information, combined with its internal variances, can provide that object 230 with a better, more refined determination of its location. This type of peer-to-peer spatial location can be used to determine the location of an object absent of any communication to a fixed marker. The more object interaction, the more accurate the location.

According to one embodiment of the present invention, the positional information of one object 240 ascertained in part by markers 230, 235 and its GPS (or interaction with other objects) can be conveyed via a peer-to-peer communication to other objects 270, 250, 220. The car 250 next to the markers 230, 235 will also possess accurate positional data ascertained from the makers 230, 235 and other nearby objects. However, the car in the intersection 270 and, more importantly, the object within the building 220, may find the positional data possessed by another object very valuable. With such relative positional data, the other objects 220 can determine their spatial location that is thereafter supplemented by their internal systems to aid in positional awareness. Moreover, an object that is further isolated in the building 210 can use information that is relayed via a daisy chain or a mesh network to gain accurate positional information.

In this example, the object 220 on the first floor of the building can gain relayed positional information from the car in the intersection 270 which can, in turn, gain relative and spatial data from the cell phone carried by the person on the corner 240 and the two streetlights 230, 235. Alternatively, the car in the intersection 270 could use data from a cell phone on the person on the corner 240 and two other cars in the intersection 250, 290 to determine or refine its position.

In the same manner, an individual who cannot independently determine their position from GPS or other sources can leverage the known geospatial data of nearby objects. The person in the lobby of the building can, according to one embodiment of the present invention, determine its location despite its inability to receive any GPS data because it can receive data from other nearby objects 270, 290, 240, 230,

235 whose position is known. With its position known and possessing a map of its local environment, it can navigate with a great deal of accuracy to areas without any traditional geospatial support. And, as the person in the lobby 220 now knows its geospatial location, it can convey that information to other isolated objects 210. If, for example, the person on the third floor 210 can receive data from the person in the lobby 220 and two others, it too can determine its geospatial location. This process can daisy chain so as to provide spatial location based on sources that they themselves have determined their geospatial location from indirect sources.

Spatial and relative positional data can be conveyed from and between other isolated objects. For example, a car located in a parking garage 260 can include a collaborative spatial positioning apparatus or system, as can a cellular phone carried by its driver. While driven, the car can gain GPS signals and, upon entering into the garage, the car can use path integration or inertial navigation to generally ascertain its position within the garage. Using data from either fixed or other nearby objects, these objects can determine and refine their spatial location. Moreover, the individual within the building 210 can also establish relative locational data with the car 260 should they need to reunite at the end of the day.

As described herein, one aspect of the present invention is that each object among a group of objects can independently develop a spatial awareness of its surrounding. That awareness can be based on a variety of positional resources and/or collaborations. Another aspect of the present invention is for a group of objects to form a collective spatial awareness or map for a local environment in which the objects operate. While the group of objects may have no appreciation for their collective location outside of their local environment, they can develop and communicate a collective relative awareness of the location of each object using one or more commonalities. Should one or more objects then gain a broader frame of reference, the entire collective spatial map can be updated. Similarly, two separate groups, each with an independently developed spatial awareness, can merge those reference frames into one coherent framework.

Figure 3:
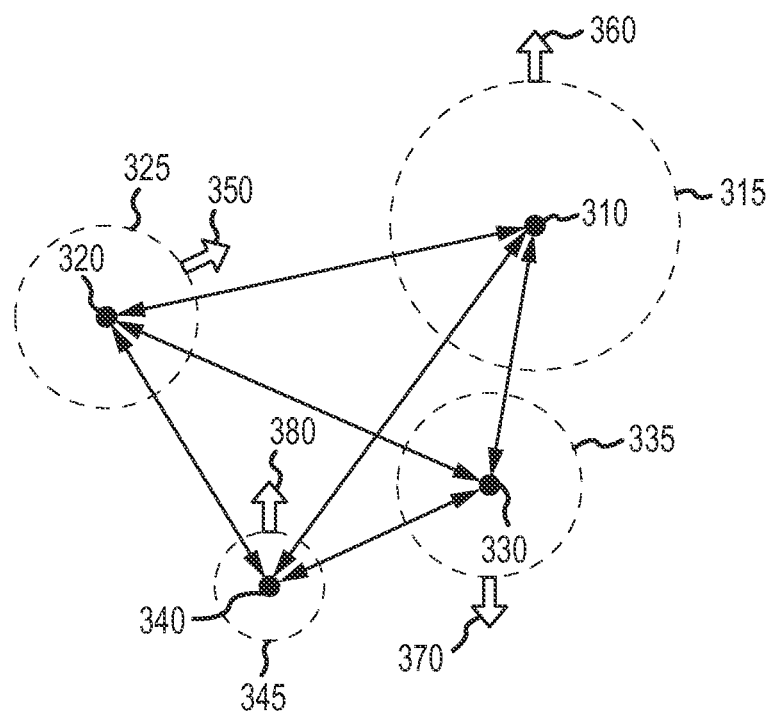
FIG. 3 shows a high level depiction of a mesh network interaction of a plurality of objects possessing collaborative spatial positioning technology.
Figure 3:
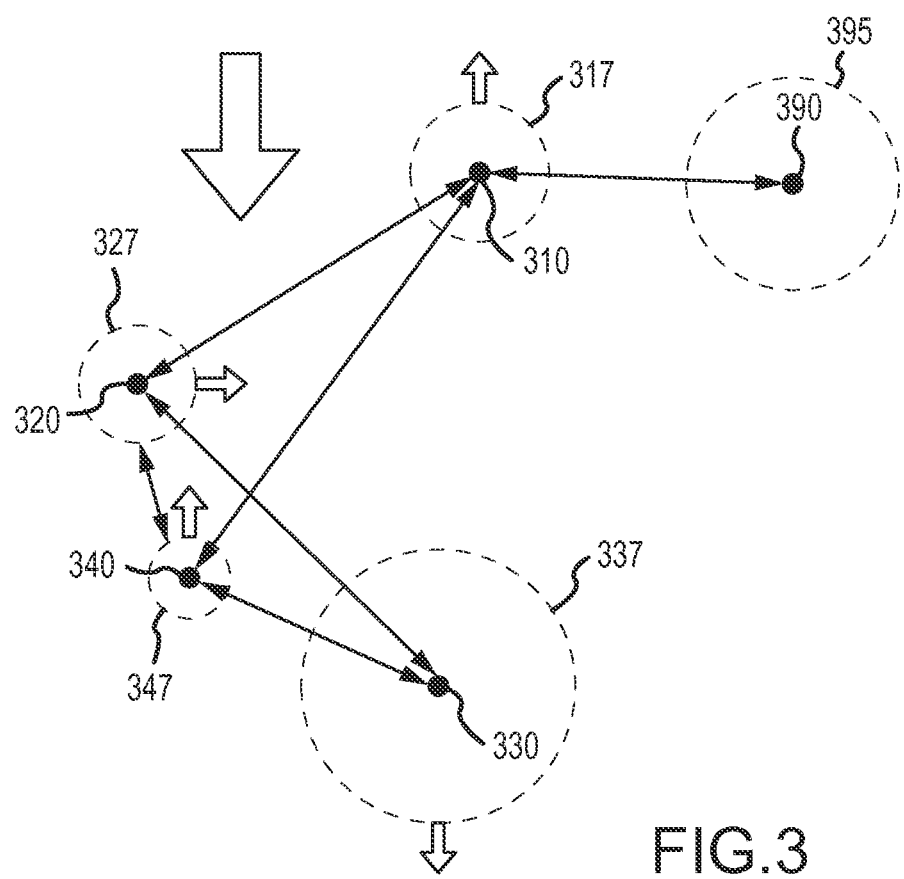

Another aspect of the present invention is its ability to collaboratively share and use spatial and relational data. FIG. 3 shows a high level depiction of a mesh network interaction of a plurality of objects possessing collaborative spatial positioning technology. In the upper portion of FIG. 3, four objects 310, 320, 330, 340 are within collaborative range of each other and are each communicatively linked forming, what one of reasonable skill in the relevant art would recognize as, a mesh network.

Surrounding each object 310, 320, 330, 340 is a ring 315, 325, 335, 345 representing the variance, or error, of each object's independent determination of its spatial position. In addition, each object includes an arrow 350, 360, 370, 380 representing the relative motion of each object. As objects come within communication range of each other, new objects are joined to an existing mesh while others exit the network. While one could abstractly view a mesh network as an infinite number of nodes, it is unlikely that such a network is feasible. A more likely scenario is a mesh network based on a central or regional control node or autonomous mesh with a limited number of nodes. In the later example, one node is established a controlling node while a finite number of client or slave nodes form the mesh. As new nodes enter or nodes exit the relationship, control of the mesh is reevaluated, as is the interaction and overlapping of mesh networks. Furthermore, nodes can exist in two or more mesh networks resulting in an overlap of data transfer. Obviously, packet and data collisions within the networks must be resolved and are beyond the scope of this discussion. For the purposes of the present invention, assume that the objects shown in FIG. 3 can form and maintain a mesh network operable to support the interaction of data among the nodes in the network.

In doing so, relevant spatial data can be conveyed from one object to another. The lower depiction of the mesh network of FIG. 3 shows modified variances 315, 325, 335, 345 for each object 310, 320, 330, 340 based on the newly acquired spatial and relational data. For example, the variance 315 of an object 310 can decrease to form a new variance 317 based on newly acquired information from other nearby objects. As the network changes, variances can increase as well 337. As new nodes 390 (and their variances 395) enter into the network, the exchange of relational and spatial data enables a continual modification of each object's ability to determine its collaborative spatial position and, in one embodiment, affect its behavior.

As described herein, one feature of the present invention is the ability for each of a plurality of objects to determine its spatial position. Moreover, this determination can be accomplished using a peer-to-peer approach in which the basis for an object's positional determination is the position of one or more other nearby objects, rather than stationary positional resources or markers. Thus, three or more objects which each possess a spatial position can be used as a basis to triangulate sensory data to determine the position of a positional indeterminate object.

Apart from determining a positional understanding within a fixed frame of reference, one aspect of the present invention enables objects to automatically calibrate their relative location, thus forming their own frame of reference. In such an instance, each object creates an individual distance map to each nearby object. The objects then communicate/share their individual distance determination to each other object within the group. Considering these collective range determinations, each node can determine its relative position to each other node. All of this can be done with nothing more than ranging data.

Figure 4:
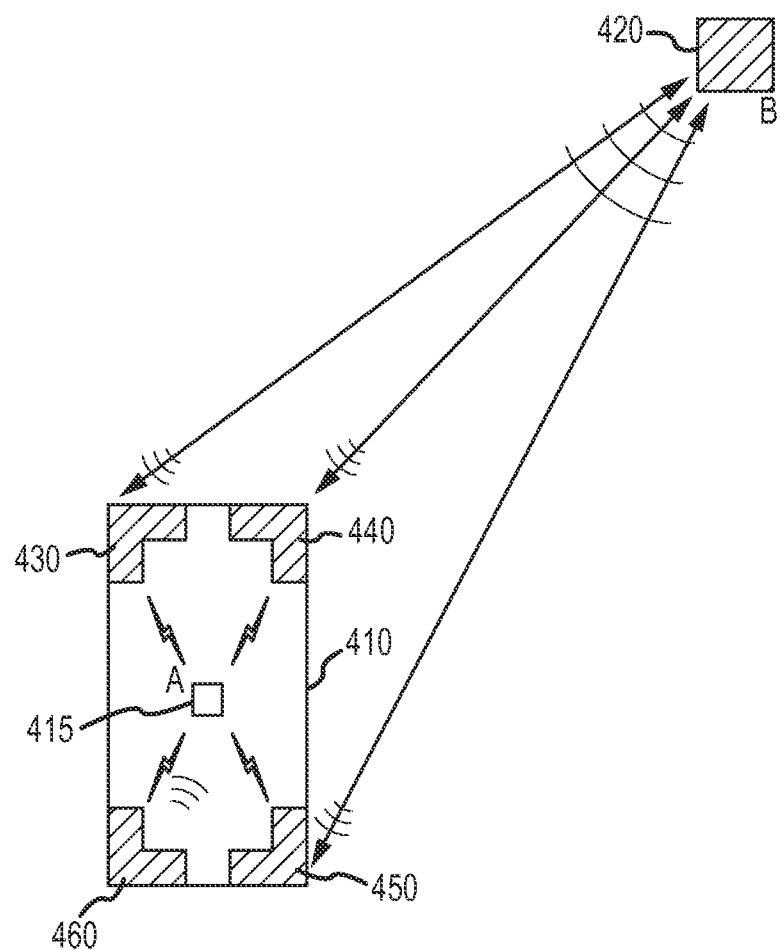
FIG. 4 is a rendering of a collaborative positional determination by a single object using multiple antenna, according to one embodiment of the present invention.

According to another embodiment of the present invention, an object can be configured with multiple antenna associated with a single tag. Using such a configuration, a single object can determine not only range but azimuth to another nearby object independently. FIG. 4 shows a rendering of collaborative positional determination by a single object according to one embodiment of the present invention. For example, assume a vehicle 410, object A, possesses antenna on each of its corners 430, 440, 450, 460. A central controller 415 communicates with each antenna and possesses an understanding of their orientation on the vehicle. As a nearby vehicle 420, object B, comes within the vicinity of object A 410, each antenna 430, 440, 450, 460 separately receives range information from the transmission tag located on object B 420. Knowing the relative position of each antenna with respect to object A 410, the controller 415 can determine a centralized bearing and collective range to object B 420.

As previously discussed, determining that an object is within a certain range from a particular point results in the spherical representation of the position of the object, relative to the point. The determination of another range to the same object from a different point creates a different independent spherical locus of possible solutions. In each case, the object is on the surface of the sphere. The intersection of two spheres is a circle meaning that the position of the object of interest is somewhere on the resulting circle. A third distance measurement will narrow down the possible locations to two points on that circle. Normally, one is a ridiculous answer and can be dismissed rather easily, however, if a fourth source of range data is available, then a precise location can be determined. In the limiting case in which both objects are substantially on the same plane, then position of the object can be narrowed down using just three antenna and in some cases, only two.

In the example shown in FIG. 4, object A 410 collects range information from each of the antenna 430, 440, 450, 460. The controller 415 knows each antenna's location from a central location of the object. Accordingly, the controller can determine object B's 420 relative position from object A 410. And over time, the controller can determine object B's relative motion. By doing so the collaborative positional determination of each object is more fault-tolerant and is self-contained. And if, in this case, object A 410, possesses its spatial location, once it possesses a relative position of object B 420 that relative location can be used by object B 420 to determine its rudimentary spatial location.

Figure 5:
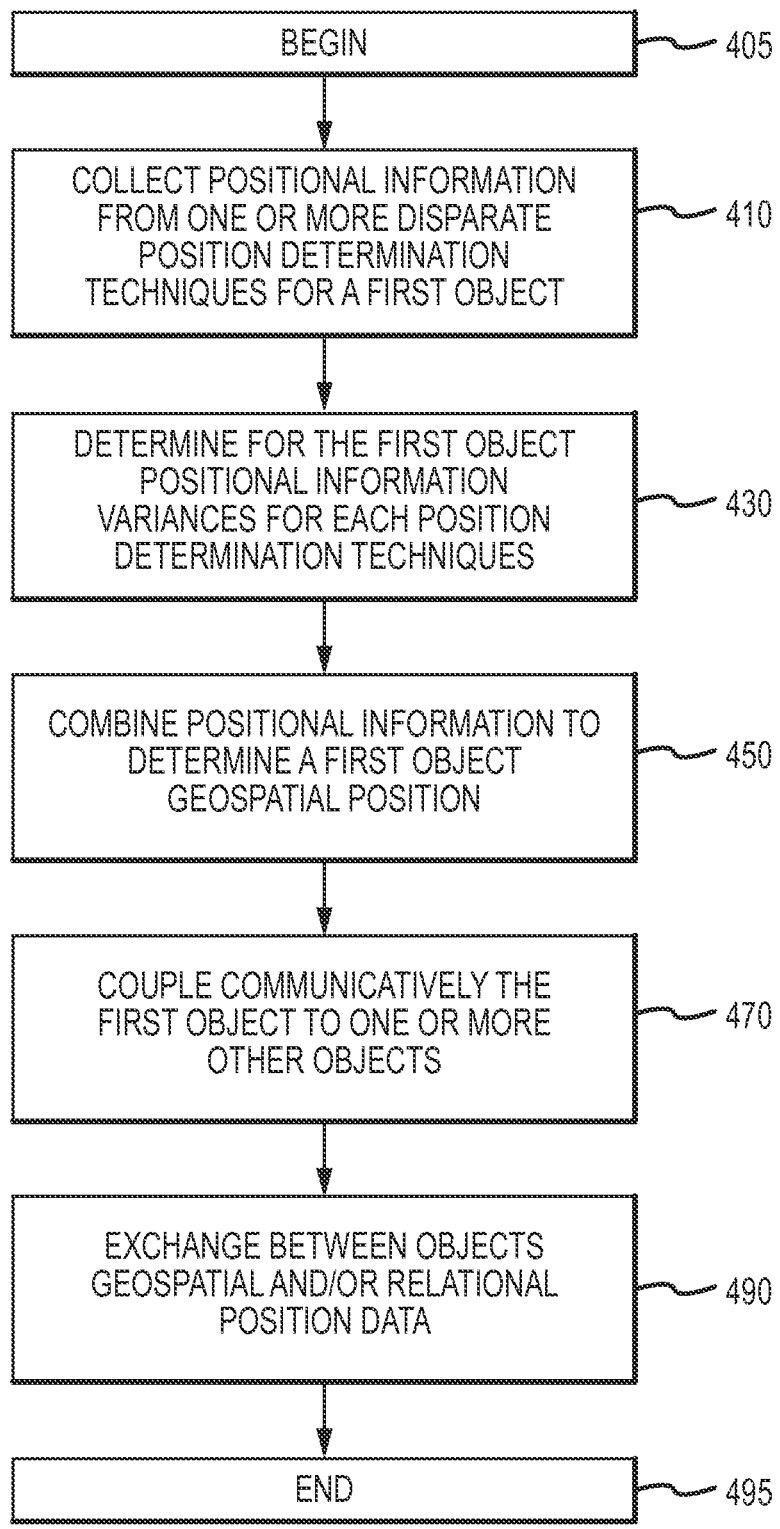
FIG. 5 is a flowchart depicting an example of the methodology that may be used to collaborate positional information according to the present invention.

FIG. 5 is a flowchart depicting one example of the methodology that may be used to collaborate positional information according to the present invention. It will be understood by one of reasonable skill in the relevant art that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture, including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware or firmware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words," or the like. These specific words, however, are merely convenient labels and are to be associated with appropriate information elements.

Unless specifically stated otherwise, discussions herein using words such as "processing," "computing," "calculating," "determining," "presenting," "displaying," or the like, may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

An exemplary process for collaborative spatial positioning according to the present invention begins 505 with the collection 510 of positional information from one or more disparate positional determination techniques or resources. These resources can include inertial systems, GPS, path integration, range localization, and the like. For an object, positional variances for each positional information resources are determined 530 so that the information provided by each resource can be weighed and valued by the object. Those with a high degree of accuracy and reliability are normally weighed and valued more than those with less accuracy and lower reliability. These variances are continually monitored and updated so that the computed spatial position is optimized.

The positional information, once evaluated and weighed, is thereafter combined 550 to determine for an object its spatial position. In addition to the individual variances of each informational source, the overall determination of position is bound so as to convey to other objects the degree of accuracy by which an object is conveying its position.

Objects are communicatively coupled 570 so as to exchange 590 spatial and relational positional information that can be then used to refine each objects' spatial location. The accuracy and reliability of this information is also conveyed so that the receiving object can determine the value of the information conveyed.

The present invention integrates localized relational positional data with fused sensor data relating to spatial positioning. By doing so, objects are not only able to more accurately determine their spatial location in a variety of environments, but to modify their behavior based on the location and relative motion of nearby objects. For example, two objects both possessing the collaborative spatial positioning technology of the present invention approach each other; the first being associated with an automobile and the other a cellular phone held by a pedestrian. As the first object, the automobile, approaches an intersection it becomes communicatively linked with the cell phone. Based on the newly enhanced spatial location information and their relative motion, both devices independently determine that a collision is imminent. In one implementation, the automobile alerts the driver and initiates actions to slow or stop the vehicle. The cellular phone broadcasts a warning, alerting its holder of the upcoming collision, providing a means by which to avoid the collision. These and other applications of a system and associated methodology for collaborative spatial positioning are possible, and contemplated by the present invention.

Upon reading this disclosure, those of skill in the art will appreciate still additional alternative structural and functional designs for a system and a process for collaborative spatial positioning through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures, and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device such as the form of a conventional personal computer, a personal communication device or the like, including a processing unit, a system memory, and a system bus that couples various system components, including the system memory, to the processing unit. The system bus may be any of several types of bus structures, including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

Embodiments of the present invention, as have been herein described, may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

An implementation of the present invention may also be executed in a Web environment, where software installation packages are downloaded using a protocol such as the HyperText Transfer Protocol (HTTP) from a Web server to one or more target computers (devices, objects) that are connected through the Internet. Alternatively, an implementation of the present invention may be executing in other non-Web networking environments (using the Internet, a corporate intranet or extranet, or any other network) where software packages are distributed for installation using techniques such as Remote Method Invocation ("RMI") or Common Object Request Broker Architecture ("CORBA"). Configurations for the environment include a client/server network, as well as a multi-tier environment. Furthermore, it may happen that the client and server of a particular installation both reside in the same physical device, in which case a network connection is not required. (Thus, a potential target system being interrogated may be the local device on which an implementation of the present invention is implemented.)

While there have been described above the principles of the present invention in conjunction with a technique for collaborative spatial positioning, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for collaborative spatial position determination between objects, comprising:
   receiving by a first object information describing a position of the first object as derived from disparate position determination techniques;
   combining information describing the position of the first object from disparate position determination techniques to determine a first object spatial position;
   establishing peer-to-peer communication between the first object to a second object; and
   exchanging between the first object and the second object information describing the position of the first object wherein the second object determines a second object spatial location based, in part, on information describing the position of the first object received by the first object, information describing a peer-to-peer relative location between the first object and the second object and disparate position determination techniques associated with the second object and wherein based on information describing the position of the first object exchanged from the first object to the second object, the second object corrects variances for each disparate position determination technique associated with the second object.

2. The method for collaborative spatial position determination between objects according to claim 1, wherein at least one of the disparate position determination techniques is based on a range and an azimuth from a known position.

3. The method for collaborative spatial position determination between objects according to claim 1, wherein the second object determines the second object spatial location based, in part, on the first object spatial position.

4. The method for collaborative spatial position determination between objects according to claim 1, wherein at least one of the disparate position determination techniques is based on an inertial navigation system.

5. The method for collaborative spatial position determination between objects according to claim 1, wherein at least one of the disparate position determination techniques is based on the intersection of three or more spheres, each sphere of a known origin and radius.

6. The method for collaborative spatial position determination between objects according to claim 5, wherein the origin of each sphere is a satellite in Earth orbit.

7. The method for collaborative spatial position determination between objects according to claim 1, wherein at least one of the disparate position determination techniques are based on interaction with an electromagnetic radio-frequency field.

8. The method for collaborative spatial position determination between objects according to claim 7, wherein interaction of the electromagnetic radio-frequency field is in the form of an ultra-wide band tag.

9. The method for collaborative spatial position determination between objects according to claim 7, wherein at least one of the disparate position determination techniques is based on a motion of the object.

10. The method for collaborative spatial position determination between objects according to claim 9, wherein positional determination based on the motion of the object includes time and velocity measurements from a known position.

11. The method for collaborative spatial position determination between objects according to claim 1, further comprising determining for the first object variances in the information describing the position of the first object for each of the disparate position determination techniques.

12. The method for collaborative spatial position determination between objects according to claim 11, wherein determining includes assigning a weighing factor to each of the disparate position determination techniques based on positional information variances.

13. The method for collaborative spatial position determination between objects according to claim 12, wherein the weighing factor changes based on changing positional information variances.

14. The method for collaborative spatial position determination between objects according to claim 13, wherein combining includes considering the weighing factor in determination of the spatial position of the first object.

15. The method for collaborative spatial position determination between objects according to claim 1, wherein exchanging information describing the position of the first object between the first object and the second object includes information describing a relative position between the first object and the second object.

16. The method for collaborative spatial position determination between objects according to claim 1, wherein the second object receives information describing the position of the first object from at least one disparate position determination techniques independent of those received by the first object.

17. A system for collaborative determination of spatial position, comprising:
   a first object;
   a second object;
   one or more disparate position determination resources operable to determine for the first object a first object spatial position; and
   a communication link between the first object and the second object wherein the second object is operable to determine for the second object a second object spatial position based, at least in part, on the first object spatial position received from the first object, and information describing a peer-to-peer relative location between the first object and the second object and wherein based on information describing the spatial position of the first object exchanged from the first object to the second object, the second object corrects variances for each disparate position determination resource operable to determine for the second object the first object spatial position.

18. The system for collaborative determination of spatial position according to claim 17, wherein at least one of the one or more disparate position determination techniques is based on a range and an azimuth from a known position.

19. The system for collaborative determination of spatial position according to claim 18, wherein the range and the azimuth are based on radio frequency transmissions between an antenna and a receiver.

20. The system for collaborative determination of spatial position according to claim 17, wherein at least one of the one or more disparate position determination techniques is based on an inertial navigation system.

21. The system for collaborative determination of spatial position according to claim 17, wherein at least one of the one or more disparate position determination techniques is based on the intersection of three or more spheres, each sphere of a known origin and radius.

22. The system for collaborative determination of spatial position according to claim 21, wherein the origin of each sphere is a satellite in Earth orbit.

23. The system for collaborative determination of spatial position according to claim 17, wherein at least one of the one or more disparate position determination techniques is based on interaction with an electromagnetic radio-frequency field.

24. The system for collaborative determination of spatial position according to claim 23, wherein interaction of the electromagnetic radio-frequency field is in the form of an ultra-wide band tag.

25. The system for collaborative determination of spatial position according to claim 17, wherein at least one of the one or more disparate position determination techniques is based on a motion of the object.

26. The system for collaborative determination of spatial position according to claim 25, wherein positional determination based on the motion of the object includes time and velocity measurements from a known position.

27. The system for collaborative determination of spatial position according to claim 17, wherein the second object spatial position includes information describing a relative position between the first object and the second object.

28. The system for collaborative determination of spatial position according to claim 17, wherein the second object receives information describing the position of the first object from the one or more disparate position determination resources independent of those received by the first object, and based on information describing the position of the first object exchanged from the first object to the second object, the second object corrects variances for each of the one or more disparate position determination resources associated with the second object.

29. A system for collaborative determination of spatial position, comprising:
a first transceiver operable to receive information describing a position of a first object derived from disparate position determination techniques;
a memory operable to store positional information received from the disparate position determination techniques;
a second transceiver operable to establish peer-to-peer communication between the first object to a second object;
a processor communicatively coupled to the memory and capable of executing instructions embodied as software; and
a plurality of software portions, wherein
one of said software portions is configured to determine a variance in the information describing the position of the first object received from the disparate position determination techniques,
one of said software portions is configured to combine information describing the position of the first object received from the disparate position determination techniques to determine a first object spatial position, and
one of said software portions is configured to exchange between the first object and the second object information describing the position of the first object as well as the variance in the information describing the position of the first object, and information describing a peer-to-peer relative location between the first object and the second object so as to enable the second object to determine a second object spatial location based, in part, on the first object's spatial position.

30. The system for collaborative determination of spatial position according to claim 29, wherein at least one of the position determination techniques is based on a range and an azimuth from a known position.

31. The system for collaborative determination of spatial position according to claim 30, wherein the range and the azimuth are based on radio frequency transmissions between an antenna and a receiver.

32. The system for collaborative determination of spatial position according to claim 29, wherein at least one of the disparate position determination techniques is based on the intersection of three or more spheres, each sphere of a known origin and radius.

33. The system for collaborative determination of spatial position according to claim 32, wherein the origin of each sphere is a satellite in Earth orbit.

34. The system for collaborative determination of spatial position according to claim 29, wherein at least one of the disparate position determination techniques is based on interaction with an electromagnetic radio-frequency field.

35. The system for collaborative determination of spatial position according to claim 34, wherein interaction of the electromagnetic radio-frequency field is in the form of an ultra-wide band tag.

36. The system for collaborative determination of spatial position according to claim 29, wherein at least one of the disparate position determination techniques is based on a motion of the object.

37. The system for collaborative determination of spatial position according to claim 36, wherein positional determination based on the motion of the object includes time and velocity measurements from a known position.

38. The system for collaborative determination of spatial position according to claim 29, wherein at least one of the disparate position determination techniques is based on an inertial navigation system.

39. The system for collaborative determination of spatial position according to claim 29, further comprising a software portion configured to assign a weighing factor to each of the disparate position determination techniques based on variance in positional information.

40. The system for collaborative determination of spatial position according to claim 39, wherein the weighing factor changes based on changing positional information variances.

41. The system for collaborative determination of spatial position according to claim 40, wherein combining includes considering the weighing factor in determination of the first object spatial position.

42. The system for collaborative determination of spatial position according to claim 29, wherein exchanging information describing the position of the first object between the first object and the second object includes information describing a relative position between the first object and the second object.

\* \* \* \* \*